United States Patent
Stratton et al.

(10) Patent No.: US 8,943,143 B2
(45) Date of Patent: Jan. 27, 2015

(54) METHOD AND SYSTEM FOR THE CONVERSION AND PROCESSING OF DOCUMENTS IN A HYBRID NETWORK ENVIRONMENT

(75) Inventors: Allan Stratton, Wakefield, MA (US); Robert J. Weideman, Boston, MA (US)

(73) Assignee: Nuance Communications, Inc., Burlington, MA (US)

( * ) Notice: Subject to any disclaimer, the term of this patent is extended or adjusted under 35 U.S.C. 154(b) by 904 days.

(21) Appl. No.: 12/570,603

(22) Filed: Sep. 30, 2009

(65) Prior Publication Data

US 2011/0078254 A1    Mar. 31, 2011

(51) Int. Cl.
*G06F 15/16* (2006.01)
*G06Q 10/10* (2012.01)

(52) U.S. Cl.
CPC ...................................... *G06Q 10/10* (2013.01)
USPC ........... 709/206; 709/205; 709/226; 709/227; 709/246

(58) Field of Classification Search
CPC .............................. G06F 15/16; G06F 15/173
USPC .......... 709/204, 205, 206, 207, 223; 715/135, 715/234, 239
See application file for complete search history.

(56) References Cited

U.S. PATENT DOCUMENTS

| | | | | |
|---|---|---|---|---|
| 6,078,924 | A * | 6/2000 | Ainsbury et al. | 1/1 |
| 6,272,485 | B1 * | 8/2001 | Sragner | 1/1 |
| 7,747,655 | B2 * | 6/2010 | Hull et al. | 707/802 |
| 2004/0167969 | A1 * | 8/2004 | Tamai et al. | 709/207 |
| 2006/0099976 | A1 * | 5/2006 | Coskun et al. | 455/466 |
| 2007/0162840 | A1 * | 7/2007 | Rochelle et al. | 715/505 |
| 2007/0174636 | A1 * | 7/2007 | Raja | 713/189 |
| 2009/0305730 | A1 * | 12/2009 | Herz et al. | 455/466 |

OTHER PUBLICATIONS

"PDF Reference (6th edition), Adobe Portable Document Format"—Adobe Systems Inc., Nov. 2006 http://www.adobe.com/content/dam/Adobe/en/devnet/acrobat/pdfs/pdf_reference_1-7.pdf.*

* cited by examiner

*Primary Examiner* — Randy Scott
(74) *Attorney, Agent, or Firm* — Sunstein Kann Murphy & Timbers LLP

(57) ABSTRACT

A method of converting a document for a user. The method includes receiving the document in a first format from a first user device through a telecommunications network. The method also includes automatically producing a new version of the document upon receipt of the document. The new version of the document is in a second format, which is selected from a group including a plurality of formats distinct from the first format.

15 Claims, 3 Drawing Sheets

METHOD AND SYSTEM FOR THE CONVERSION AND PROCESSING OF DOCUMENTS IN A HYBRID NETWORK ENVIRONMENT

TECHNICAL FIELD

The present invention relates to processing and converting documents, and more particularly to a system that remotely automates that process.

BACKGROUND ART

It is known in the prior art to run programs locally on a computing device and to use the locally installed program for changing a document from one format to a different format. Additionally, it is known in the prior art to provide online services through which a user located at a remote location from the service provider can send a document to the service provider for printing at the provider's location. Some online service providers also allow a user to access their service to obtain access to more features of a document. Other service providers allow users to create online accounts, which the users can access for uploading documents in order to convert the documents to a specific alternative format. The user may then receive the converted results back in an e-mail.

However, even in view of these services, users still need a service that allows them to produce documents in a variety of different formats and may desire to do so from various remote locations without the need to install additional software on a computing device. Additionally, a service that includes an automation capability that selectively determines a user's conversion requirements without specific input from the user provides significant advancements and advantages to document conversion processes.

SUMMARY OF THE INVENTION

In accordance with an embodiment of the present invention a method of converting a document for a user is provided. The method includes receiving the document in a first format from a first user device through a telecommunications network and automatically producing a new version of the document upon receipt of the document. The new version of the document is produced in a second format selected from a group that includes a plurality of formats distinct from the first format. The method may also include transmitting the new version of the document to the first user device. Alternatively or additionally, the method may include transmitting the new version of the document to a second user device.

In a related embodiment the method may also include storing the new version of the document on a storage device remotely accessible by at least one of the group including the first user device and the second user device.

In another related embodiment the first user device is a multifunction printer.

In yet another related embodiment the telecommunications network is a computer network.

In another related embodiment the telecommunications network is a cellular network.

Another embodiment of the present invention provides a method of converting a document for a user that includes receiving the document from a first user device through a telecommunications network and automatically producing a plurality of new versions of the document upon receipt of the new document, where the plurality of new versions includes a second plurality of formats. The method may also include transmitting the plurality of new versions of the document to the first user device. The second plurality of formats may include Word, PDF, PowerPoint (PPT) and Excel formats.

In accordance with another embodiment of the present invention a method of converting a document for a user is provided that includes receiving the document from a first user device through a telecommunications network, surveying the document, wherein surveying the document includes scanning content of the document and outputting data related to the document, the data identifying a plurality of characteristics of the document, automatically selecting a format for the document based on the survey, and producing a new version of the document in the selected format. The method may also include transmitting the new version of the document to the first user device.

In accordance with other embodiments of the present invention a method of converting a document for a user is provided that includes receiving the document as an attachment to an e-mail sent from a first user device through a telecommunications network, the e-mail including a recipient address and automatically producing a new version of the document in a particular format upon receipt of the document. In these embodiments the particular format of the new version of the document is selected based on the recipient address. The method may also include transmitting the new version of the document to the first user device. Alternatively or additionally, the method may include transmitting the new version of the document to a second user device.

In accordance with another embodiment of the present invention a computer program product for converting a document for a user is provided. The computer program product includes a computer usable medium having computer readable program code thereon. The computer readable program code includes program code for surveying a document received from a first user device through a telecommunications network and program code for automatically producing at least one new version of the document upon receipt of the document based on at least one of the group including a recipient e-mail address, an appendage to the document; a sender e-mail address, and document content. The computer program product may also include program code for transmitting the new version of the document to the first user device. Alternatively or additionally, the computer program product may include program code for transmitting the new version of the document to a second user device. The document appendage may be a cover sheet or the document appendage may be a marker added to a page of the document.

Another embodiment of the present invention provides a system for converting a document for a user. The system includes a surveying module, a document revision module, and a transmission module. The surveying module is operable to scan content of the document received from a user device and output data related to the document, the data identifying a plurality of characteristics of the document. The document revision module is automatically operable to produce a new version of the document in a format specified by data provided from the surveying module. The transmission module is operable to transmit the new version of the document to at least one of the group including the first user device and a second user device through a telecommunications network.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
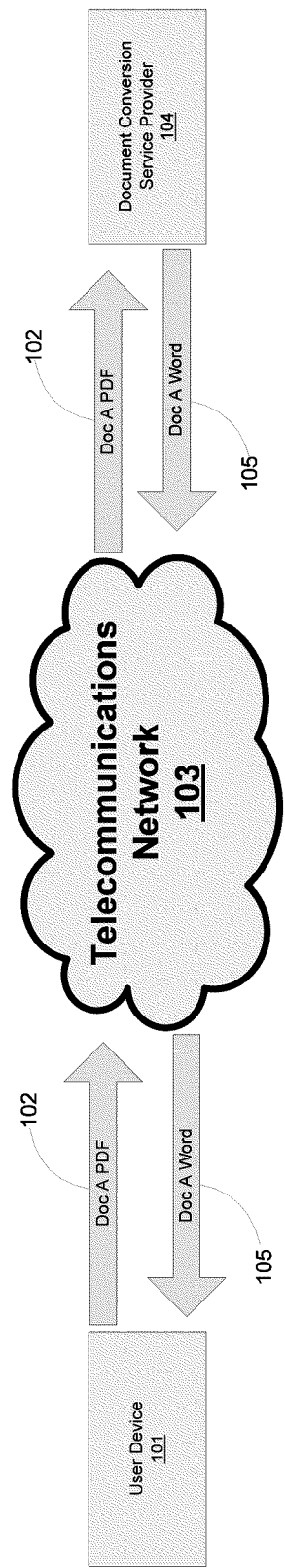
FIG. 1 illustrates the document processing and conversion system in accordance with an embodiment of the present invention.

FIG. 1 illustrates the document processing and conversion system in accordance with an embodiment of the present invention. The invention provides document processing and conversion functionality for devices and users where the functionality for processing and converting documents are manageable outside of the user's network. As demonstrated in FIG. 1, a telecommunications network 103 links the device of a user 101 and the device of a service provider 104. This network may be the internet, a computer network, a cellular or radio network or any other electronic network used to link two devices located at remote locations with respect to one another. The network allows the user to send a document 102, such as document A, to the service provider to engage the service provider's conversion service. As illustrated, document A may be in the form of a PDF document and the system may be used to produce a new version of the document in the format of a Word document. The system may choose the format of the document independent of the user's specification. They system may also choose the format from a variety of format options, making the decision based on various document or request parameters.

As illustrated in FIG. 1 the service provided by the system of the current invention may reside outside of the user's network. In some embodiments of the present invention, implementation of the system is achieved without any local software installations on the user's device. The system may be directly accessed from a variety of input devices including, but not limited to a desktop or laptop computer, a networked multifunction printer, a personal digital assistant, a mobile phone, or any other device capable of connecting to a telecommunications network and sending or forwarding documents through the network. Each of these devices may be used to access the full functionality of the system and modify any of the output settings as needed. Additionally, because each of these devices may be directly connected to the service provided through the current invention, the user avoids the need to upload the document via to a website. In contrast, the user is able to provide the document, via the input device, directly to the service provider's system. The documents may be provided to the system in a variety of ways including, but not limited to, sending the documents via e-mail, uploading them to a storage device of the system, or faxing them. As such, the systems for image processing of such documents, including optical character recognition systems and other systems that convert to image and text formats, may be located solely on the service provider device. Some of these devices such as the multifunction printer may include a user interface on the control panel, which allows a user to control the output settings of the service directly from the device. Other devices, such as a mobile phone or similar devices may also include user interfaces that similarly allow a user to control the conversion settings of service directly from the device. When the uploading device is a scanner, printer, all-in-one device, or other device without a direct network connection, the user may use an interface on a desktop PC, for example, that is connected to a network to transfer the associated files to the system.

Figure 2:
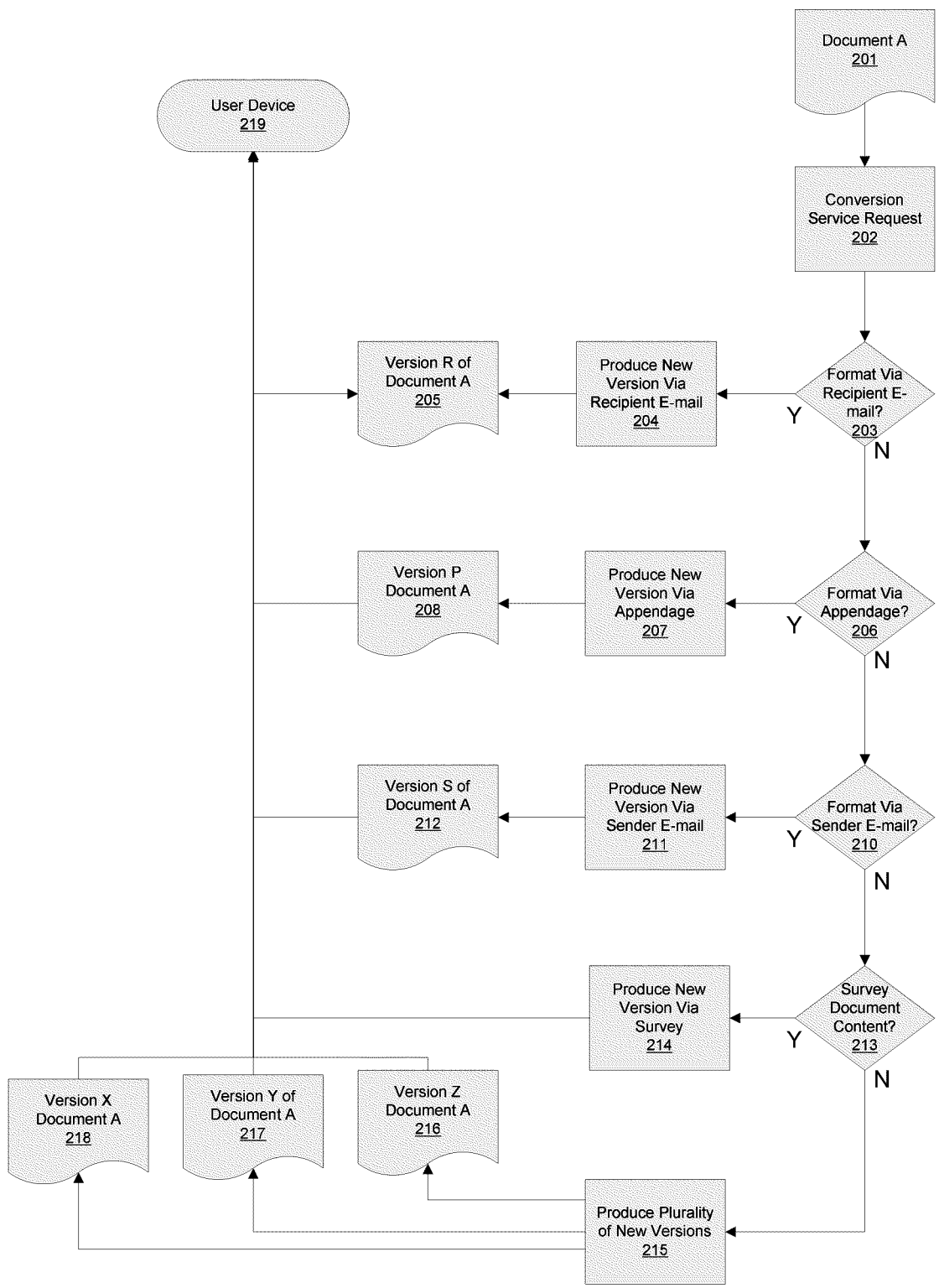
FIG. 2 is a flowchart illustrating a configuration of the processing and conversion system in accordance with an embodiment of the present invention.

FIG. 2 is a flowchart illustrating a configuration of the processing and conversion system in accordance with an embodiment of the present invention. As demonstrated in FIG. 2 the conversion process may be achieved once a document is sent to the service provider. The output may be produced by the system in numerous ways. In one embodiment of the invention, the system is set up to implement a protocol for producing a new version of the document based on the document and or request received from the user. The system may systematically, survey the document or the request for a specific characteristic and implement a conversion protocol based thereon. If the system does not locate a specific characteristic, the system may automatically attempt to implement a different protocol and continue with such iterations until the document has been successfully converted into a new format.

By way of example of the iterative system, a user may send document A, 201, to the system. Once the system receives the document, a conversion request, 202, is generated. The request begins by trying to implement a recipient e-mail protocol. The system may be configured so that when a user sends a document to the system addressed to a certain recipient including a keyword in the address such as "Word@" or "PDF@," the system recognizes the keyword in the address and implements a conversion protocol based on this identification. If the system recognizes the recipient e-mail address or a keyword in the recipient address at phase 203 of the process the system can move to phase 204, to produce a new version of the document, 205, based on that identification. The new version of the document, 205, may then be sent to a user device, 219, which may be the device from which the document was sent or it may be a third device, depending on the system settings, which may be specified or modified by the service provider and or the user.

In the event that no recognizable recipient address is present in the document the system may automatically move forward and attempt to implement another document conversion protocol, such as a conversion based on some appendage to the document, as noted by phase 206 of the process. The document, for example may include a coversheet specifying the new format desired by the user. The coversheet may be reviewed digitally or optically for keywords indicating the desired format on a cover sheet. If such indicia is identified, the system may implement a conversion protocol 207 based on this indicia and proceed to produce a new version of the document, 208. If protocol 207 is implemented instead of protocol 204, the new version of the document 208, may be produced in the same format that it would have been if produced by protocol 204 had be used or it may be different. If version P, 208, of document A is produced the system may then proceed to transmit the document back to a user device 219. Here, as before, the user device may be the device from which the document was originally sent or it may be a different device. Additionally, the user device to which the document is sent, if at all, may include a variety of devices. The document may be sent to a recipient at a specific e-mail address. In some embodiments of the invention, the new version of the document may simply be stored in a storage device accessible by a user. For example, the device may be stored on a storage device of the service provider, which is connected to a telecommunications network. The user may access that storage device via the network, download, and print the new version of the document.

If no appendage is identifiable in phase 206, the system may proceed to phase 210 where it checks the document and requests for a specific e-mail address of the sender. A sender may specify that e-mails sent from that sender or that e-mail sent from a group of senders, for example all the senders of a certain company or all the senders with an e-mail address having the same domain name, be formatted to a specific new format unless otherwise indicated. If the sender's email address or a part of the sender's email address, such as the domain name, is recognized, then protocol 211 may be implemented to produce a new version, 212, of the original document, 201. This document may be transmitted to the appropriate user device 219.

If the sender's address is not recognized, then the system may proceed to implement phase 213, wherein the content of the document is surveyed. In surveying the document, numerous features may be utilized to identify certain characteristics or features of the document. The document may be surveyed using OCR techniques or any other suitable techniques for identifying the content of the document. Once certain characteristics of the document are identified, the system may implement protocol 214, wherein a new version of the document is produced based on the system's analysis of the format that is well suited for the new version of the document. For example, if a document is analyzed or surveyed and the results indicate that the document, whether originally in a Word, PDF, or other format includes only tables, the system may deduce that the document should be reproduced in an Excel format. The system may choose from a variety of new formats when deciding the best format for the new version of the document. The overall list of formats from which the system chooses may include the format of the original document, but generally includes at least two other formats in addition to that format.

As an alternative to surveying the document, the system may simply proceed to implement protocol 215, wherein multiple new versions of the document are automatically produced in multiple new formats. All of the new versions of the documents, 216-218, may then be sent to the user for the user's own discretion as to which format(s) they wish to maintain.

While phases 203, 206, 210, and 213 are demonstrated and described with reference to FIG. 2 in a specific order. The system may be configured to move from attempting to implement the protocol associated with that phase to the protocol associated with another phase in a different order. For example, the system could attempt to format the document via the sender's e-mail address, 210, before it attempts to format the document via an appendage, 206.

In other embodiments of the invention, each of the phases, 203, 206, 210, and 213 may be embodied in independent systems and any one of the systems may be provided as a separate service. For example, an embodiment of the invention may include documents going directly and only to phase 213 and multiple formats of that document are automatically sent to each user that uploads or sends something to that embodiment of the invention. An example of the operation of such a system is demonstrated further in FIG. 3

Figure 3:
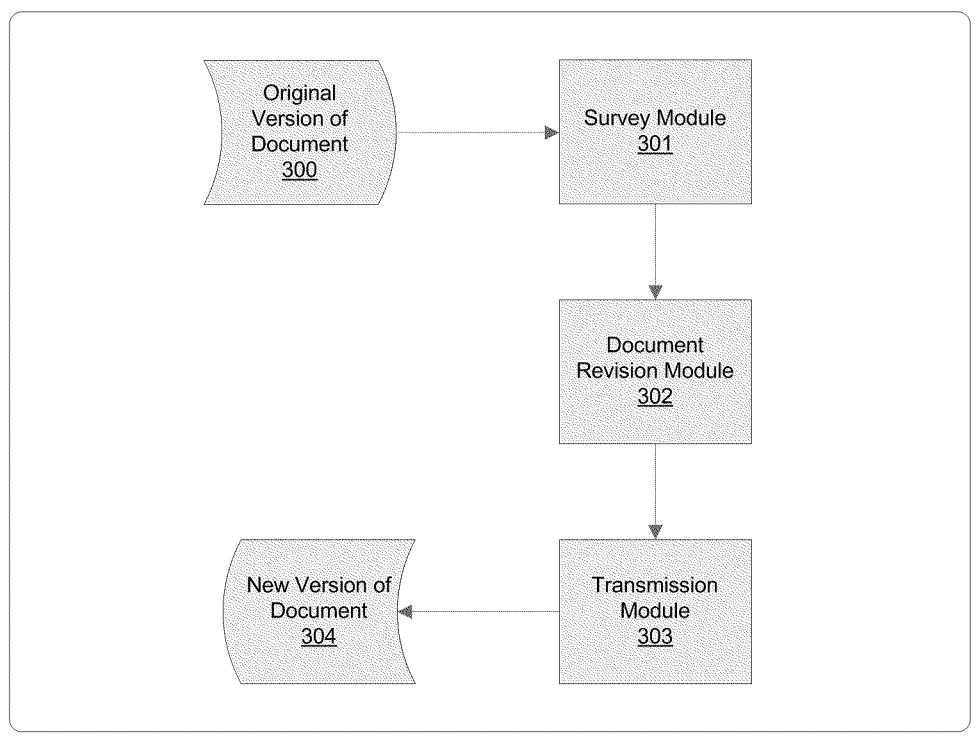
FIG. 3 is a flowchart illustrating software modules for converting a document, in accordance with an embodiment of the present invention.

FIG. 3 is a flowchart illustrating software modules used for converting a document into a new version, in accordance with an embodiment of the present invention. In this illustration, the original version of the document, 300 once received is analyzed by the survey module, 301. Once survey module 301 has made certain identifications with regard to the document, which may include what type of document it is, for example, a spreadsheet, an invoice, a business letter, etc., the information may be transmitted to the document revision module, 302. The document revision module, 302 may then be further accessed to begin the conversion process. The document revision module, 302, may be programmed to produce a new version of the document in a specific format or it may produce multiple new versions of the document in a variety of formats. Once the document has been converted to at least one new format, the transmission module 303 may proceed to control the transmission of the new version of the document 304 to a new location, which may include a storage device, or one or more user devices.

Embodiments of the disclosed system and methods may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WiFi, microwave, infrared or other transmission techniques). The series of computer instructions may embody all or part of the functionality previously described herein with respect to the system.

Those skilled in the art will recognize that such computer instructions may be written in a number of computer programming languages for use with many computer architectures or operating systems. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, field programmable gate arrays, and/or digital signal processors), or other related components. In addition, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink-wrapped software), preloaded with a computer system (e.g., on system ROM or fixed disk), or distributed from a server or electronic bulletin board over the network (e.g., via the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of converting a document for a user, the method comprising:

defining a format selection criteria group that includes a recipient e-mail address, an appendage to the document, a sender e-mail address, and document content;

receiving the document via a telecommunications network from a first user device at a location physically remote from the first user device, the document having a first format; and automatically producing a new version of the document upon receipt of the document, the new version of the document having a second format different from the first format;

wherein the second format is selected based on a format selection criteria chosen from the format selection criteria group following an iterative document conversion process that selects the second format:
   i. based on the recipient e-mail address if one is available, or else
   ii. based on the appendage if one is available, or else
   iii. based on the sender e-mail address if one is available, or else
   iv. based on the document content.

2. A method of converting a document according to claim 1 further comprising transmitting the new version of the document to the first user device.

3. A method of converting a document according to claim 1 further comprising transmitting the new version of the document to a second user device.

4. A method of converting a document according to claim 1 further comprising storing the new version of the document on a storage device remotely accessible by at least one of the group including the first user device and the second user device.

5. A method of converting a document according to claim 1, wherein the first user device is a multifunction printer.

6. A method of converting a document according to claim 1, wherein the telecommunications network is a computer network.

7. A method of converting a document according to claim 1, wherein the telecommunications network is a cellular network.

8. A method of converting a document for a user, the method comprising:
   defining a format selection criteria group that includes a recipient e-mail address, an appendage to the document, a sender e-mail address, and document content;
   receiving the document via a telecommunications network from a first user device at a location physically remote from the first user device; and
   automatically producing a plurality of new versions of the document upon receipt of the new document, the plurality of new versions including a second plurality of formats;
   wherein the second formats are selected based on a format selection criteria chosen from the format selection criteria group following an iterative document conversion process that selects the second formats:
      i. based on the recipient e-mail address if one is available, or else
      ii. based on the appendage if one is available, or else
      iii. based on the sender e-mail address if one is available, or else
      iv. based on the document content.

9. A method of converting a document according to claim 8 further comprising transmitting the plurality of new versions of the document to the first user device.

10. A method of converting a document according to claim 8, wherein the second plurality of formats includes Word, PDF, PPT, and Excel.

11. A computer program product for converting a document for a user, the computer program product comprising a non-transitory computer usable medium having computer readable program code thereon, the computer readable program code comprising:
   program code for defining a format selection criteria group that includes a recipient e-snail address, an appendage to the document, a sender e-mail address and document content;
   program code for receiving a document via a telecommunications network from a first user device at a location physically remote from the first user device, the document having a first format; and
   program code for automatically producing at least one new version of the document upon receipt of the document the new version of the document having a second format different from the first format;
   wherein the second format is selected based on a format selection criteria chosen from the format selection criteria group following an iterative document conversion process that selects the second format:
      i. based on the recipient e-mail address if one is available, or else
      ii. based on the appendage if one is available, or else
      iii. based on the sender e-mail address if one is available, or else
      iv. based on the document content.

12. A computer program product according to claim 11 further comprising program code for transmitting the at least one new version of the document to the first user device.

13. A computer program product according to claim 11 further comprising program code for transmitting the at least one new version of the document to a second user device.

14. A computer program product according to claim 11, wherein the appendage is a cover sheet.

15. A computer program product according to claim 11, wherein the appendage is a marker added to a page of the document.

* * * * *